United States Patent [19]

Le Naour et al.

[11] Patent Number: 5,163,347
[45] Date of Patent: Nov. 17, 1992

[54] DEVICE FOR CUTTING OFF THE UPPER PORTION OF A CONTAINER CONSTITUTING FOR INSTANCE A BOTTLE NECK

[75] Inventors: Laurent Le Naour, Vernouillet; Edgar Dardaine, Sorel-Moussel, both of France

[73] Assignee: Stork Dardaine Industries S.A., France

[21] Appl. No.: 712,083

[22] Filed: Jun. 7, 1991

[30] Foreign Application Priority Data

Jun. 18, 1990 [FR] France ................................ 90 07588

[51] Int. Cl.5 .............................................. B23B 5/14
[52] U.S. Cl. .......................................... 82/84; 82/86; 82/101
[58] Field of Search ................ 82/114, 128, 101, 46, 82/48, 54, 56, 58, 70.1, 70.2, 84, 86, 88, 92, 1.11, 113; 53/381.2

[56] References Cited

U.S. PATENT DOCUMENTS

| 3,023,655 | 3/1962 | McDaniel | 82/114 |
| 3,347,118 | 10/1967 | Gore et al. | 82/128 |
| 3,682,026 | 8/1972 | Criss et al. | 82/101 X |
| 3,886,824 | 6/1975 | Michel et al. | 82/101 X |
| 3,906,821 | 9/1975 | Schultz, Jr. | 82/79 |
| 3,967,516 | 7/1976 | Griesing et al. | 82/101 X |

FOREIGN PATENT DOCUMENTS 2213148 8/1974 France .

Primary Examiner—Z. R. Bilinsky
Attorney, Agent, or Firm—Ostrolenk, Faber, Gerb & Soffen

[57] ABSTRACT

A device for cutting off the top part of a container such as a bottle neck, comprising a plurality of pivoted arms operating like nippers gripping round the bottle necks and which carry each one at least at one of their ends a cutting form roller disposed between two form rollers for driving and guiding the bottle necks, the device allowing the indivudual cutting of closed bottles of plastics material adapted to contain any food liquid such as milk for instance.

11 Claims, 3 Drawing Sheets

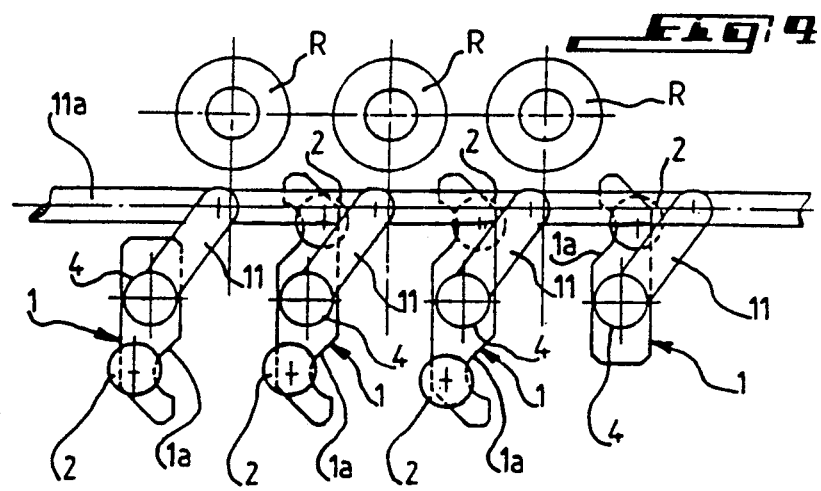
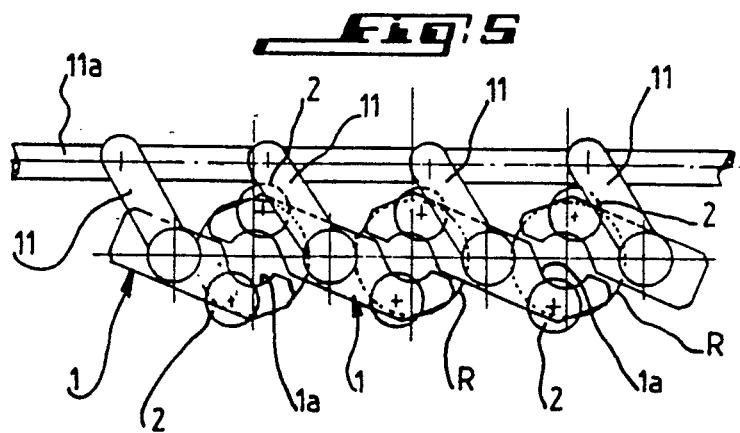
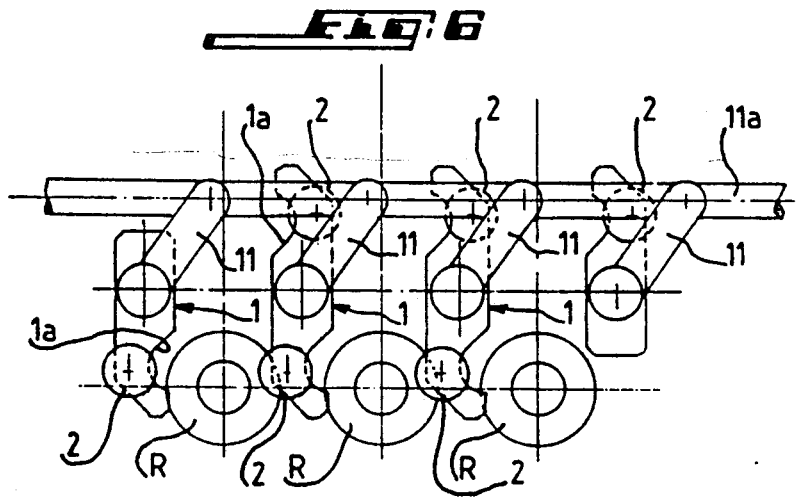

DEVICE FOR CUTTING OFF THE UPPER PORTION OF A CONTAINER CONSTITUTING FOR INSTANCE A BOTTLE NECK

The present invention relates essentially to a device for cutting off the upper part of a container or vessel and in particular allowing to cut off the closed neck of a bottle made from plastics material before the filling thereof.

There has already been proposed systems for cutting off or beheading the closed bottles of plastics material issuing from an extruder or from a storage facility.

In a general manner these systems comprised one or several circular form cutters projecting between two guides between which the bottles are passing in a line, i.e. one behind the other so that the necks of these bottles may be cut off successively. But with these systems the bottles were not properly held thereby generating defects in cutting off their necks let alone the fact that since the bottles were pushed or driven one behind the other, there could occur falls of bottles the necks of which could then not undergo the cut-off step.

The object of the present invention is to cope in particular with the above inconveniences by providing a device for individual cutting off for each bottle and owing to which the cutting-off operation is performed while the positive gripping of the necks of each bottle is ensured.

For that purpose the subject of the invention is a device for cutting off the top part of a vessel or container constituting for instance a bottle neck and of the type comprising means for holding the bottles in order to permit to cut off the neck by means of a circular formed or the like cutter, characterized in that the said means consist of at least two pivoted arms which operate in the manner of tongs, pliers or nippers gripping round the neck of the bottle and at least one of which carries at least one circular form tool for cutting off the said neck upon its rotation.

According to a preferred embodiment each arm carries at at least one of its ends a circular form cutting roller disposed between two rollers for driving and guiding the neck of the bottle.

According to another characterizing feature of the device of the invention both ends of each arm are curved in opposite directions so that the said ends co-operate each one with one of the curved ends of another arm and and so that the aforesaid rollers associated with the ends of the arm grip round the necks of the bottles.

In other words the rollers arranged at the bent ends of each arm are positioning themselves about the neck of each bottle for rotating same and for cutting off same in a guided fashion.

According to still a further characterizing feature of this device each arm is rotated by a quill or the like through which extends a shaft carrying a gear meshing with other gears made fast to the neck cutting rollers and to the neck driving and guiding rollers.

Moreover each arm carries intermediate gears providing for the kinematic connection between the gear carried by the shaft and the aforesaid bottle neck cutting and driving-guiding rollers.

It should further be specified here that the quill is fastened substantially in the middle of each arm so that the gear carried by the shaft which extends through this quill drives on either side of the axis of the shaft and successively a first intermediate gear, a gear made fast to a drive and guide form roller, a second intermediate gear, a gear made fast to a cutting form roller, a third intermediate gear and a gear made fast to another drive and guide form roller for the neck of the bottle.

According to still another characterizing feature of the invention each quill from which is suspended an arm is fitted onto a tubular element secured to a frame and removably fastened to this tubular element by means of a screw.

Each quill hence each arm may be rotated in either direction by a link pivotally connected to a rod operable by any suitable means.

The invention will be better understood and further objects, characterizing features, details and advantages thereof will appear better as a following explanatory description proceeds with reference to the accompanying diagrammatic drawings given by way of non limiting example only illustrating a presently preferred specific embodiment of the invention and wherein:

FIGS. 4 to 6 are to plan views illustrating the three essential operating phases, respectively, of the cutting device according to the invention.

Figure 1:
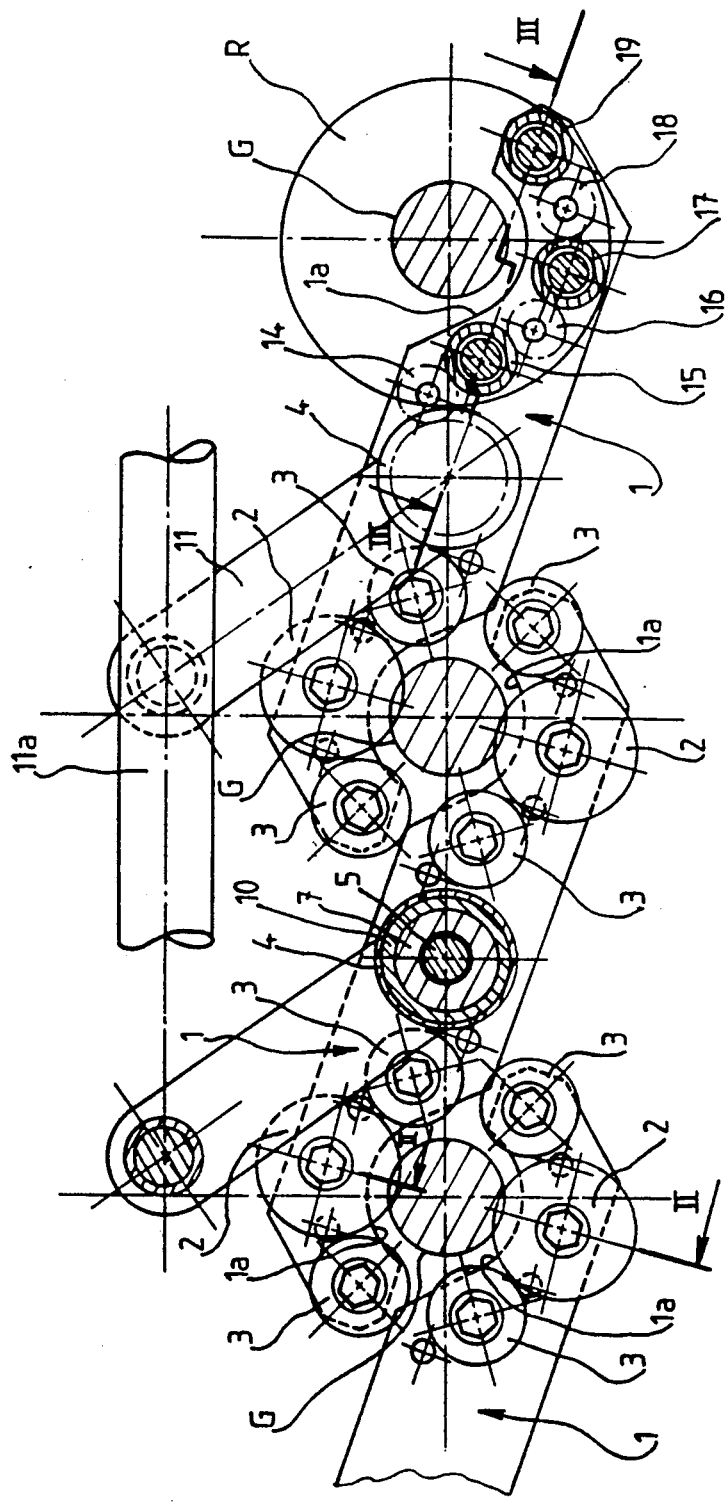
FIG. 1 is a partial top plan view and in section taken upon the line I—I of FIG. 3 showing a device according to the principles of the invention, the cutting, drive and guide form rollers having been emitted on the right-hand side of the Figure so as to in particular show the gears associated with these form rollers.
Figure 3:
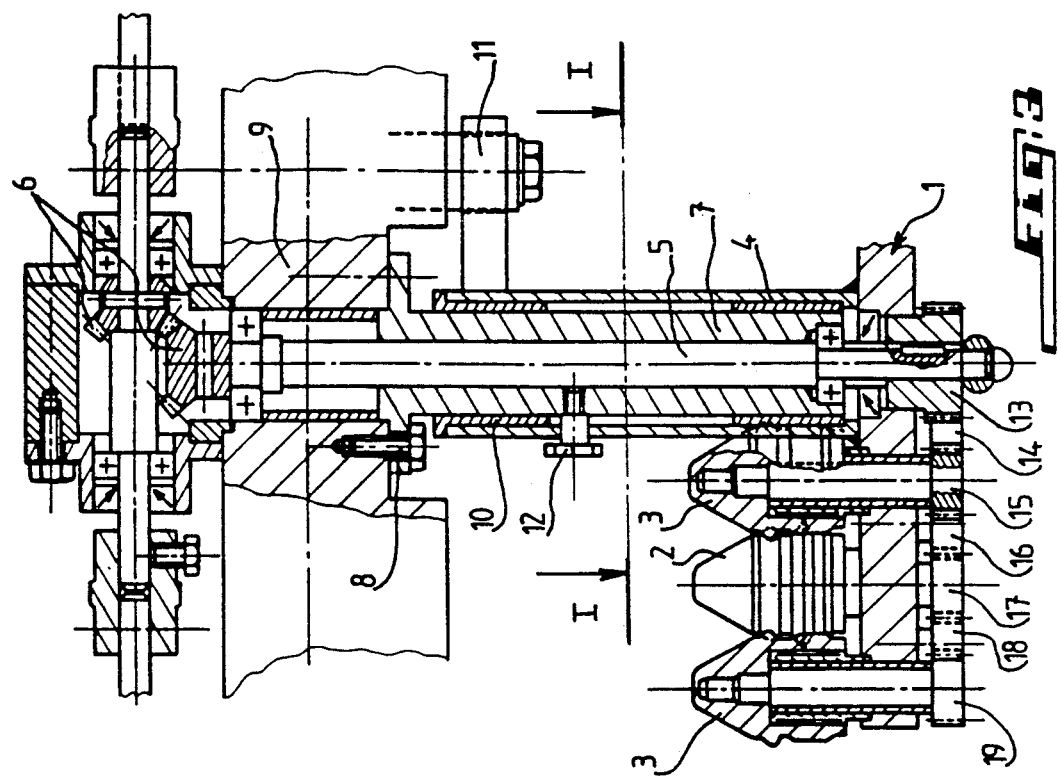
FIG. 3 is a view in section taken upon the line III—III of FIG. 1.
Figure 2:
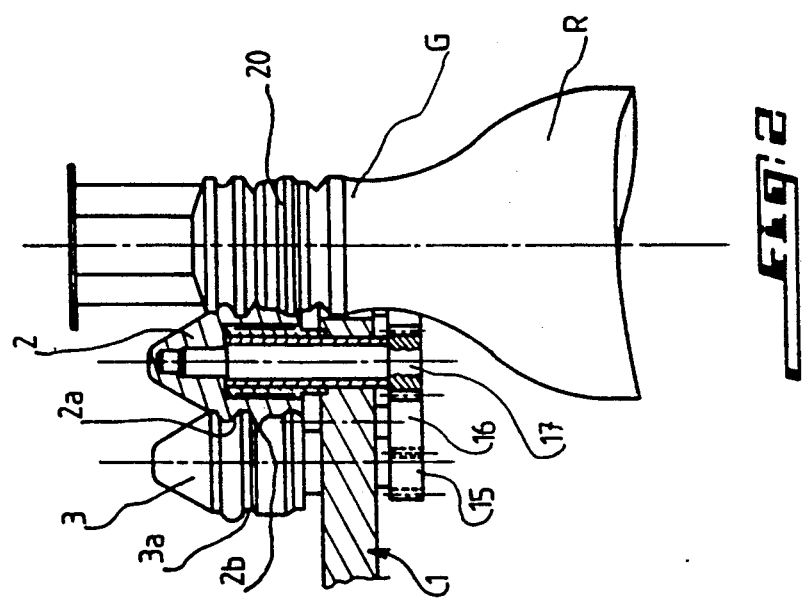
FIG. 2 is a view in section taken upon the line II—II of FIG. 1.

Referring more particularly to FIGS. 1 to 3 and according an exemplary embodiment it is seen that a device for cutting off necks G of closed bottles R of plastics material essentially comprise according to this invention a plurality of pivoted arms 1 which operate in the manner of tongs for gripping round the neck G and which each one comprise two ends 1a curved in opposite directions and giving each arm somewhat the shape of an S. In particular, for each of the arms 1, except those arms at each end of the device, each end 1a defines a curved depression that receives one side of an individual bottle neck G. The depression at one of the two ends 1a of one arm 1 faces in one direction and the depression at the other end 1a of this same arm faces in the opposite direction. Each one of these ends 1a also carries a cutting form roller 2 disposed between two form rollers 3 for rotatingly driving and guiding the necks G of the bottles R.

As is well seen on FIG. 1 both curved ends 1a of one arm co-operate with one of the curved ends of another arm, respectively, so that the form rollers 2 and 3 associated with the ends 1a may grip round the necks G of the bottles R individually.

Each arm as is better seen on FIG. 3 may be rotated by a quill or like sleeve 4 one of the ends of which is secured as be welding for instance onto the middle part of each arm 1 (see FIG. 1).

Through each quill 4 from which is suspended an arm 1 extends a shaft 5 rotated within the quill 4 by any suitable means (not shown) and this through the agency of bevel gears designated at 6 on FIG. 3.

The shaft 5 revolves within a tubular element 7 fastened through the medium of screws 8 for example onto the frame 9 of the appliance whereas the quill 4 carries an arm 1 fitted onto the tubular element 7 with the interposition between the quill 4 and the tubular element 7 of a guide and centering ring 10. Each quill 4 hence each arm 1 associated with said quill is retained on the tubular element 7 by a screw designated at 12 and thus allowing to carry out a removable mounting of each arm 1 onto the frame 9 of the apparatus.

Each quill 4 hence each arm 1 may be rotated in either direction owing to a link 11 well visible on FIGS. 1, 3 and 4 to 6, this link being pivotally mounted on a rod or the like 11a operable in two opposite directions by any suitable pneumatic or electric system for instance.

The lower end of the shaft 5 carries a pinion 13 meshing with other pinions made fast to cutting form rollers 2 and to drive and guide form rollers 3 for the necks G of the bottles R.

According to a preferred examplary embodiment and as this is well visible on the right-hand side of FIG. 1 and FIG. 3, the pinion 13 of the shaft 5 successively drives on either side of the axis of this shaft a first intermediate pinion 14 made fast to the arm 1, a pinion 15 made fast to a drive and guide form roller 3, a second intermediate pinion 16, a pinion 17 made fast to a cutting form roller 2, a third intermediate pinion 18 and a pinion 19 made fast to another drive and guide form roller 3 for the necks of the bottles R.

This series of pinions from the pinion 13 of the shaft 5 to the end of the arm 1 is provided at both ends of this arm as is understandable with reference to FIG. 1.

The operation of the cutting device which has just been described will now be explained with reference to FIGS. 4 to 6.

On FIG. 4 there is seen a row of bottles R ready to be transferred to the cutting device according to this invention whereas this device is in the position with the nipper open, i.e. the arms 1 are spread apart from each other.

Through actuation of the rod 11a hence of the links 11 the arms 1 would close with their ends 1a about the necks G of the bottles so that the cutting form rollers 2 and the drive and guide rollers 3 would come in engagement with the said necks. Thus the guide form rollers and the cutting form rollers would guide the bottle neck at six points or spots as may be seen on FIGS. 1 and 5.

All these form rollers 2 and 3 will be rotated by the shaft 5 and by all the gears previously described so that each bottle will be rotated by the form rollers about its axis, the cutting form rollers 2 cutting off the bottom neck during this rotation.

The cutting having been completed and as it may be seen on FIG. 6 the arms 1 forming nippers are opened by the actuation of the rod 11a and the links 11 thereby allowing a new transfer of a row of bottles.

There has accordingly be provided according to the invention a system for cutting off or beheading the bottle necks which ensures a positive grip of each bottle neck and allows a reliable, accurate or precise and guided cutting of each bottle neck without any risk of defective cuttings or even of any lack of cutting.

The invention is of course not at all limited to the embodiment described and illustrated which has been given by way of example only.

Thus the circular notches or grooves or serrations or flutes 2a provided on the cutting form rollers 2 and participating in the guiding and in the driving of the bottle necks as well as the circular notches, grooves, serrations or flutes 3a on the guide and drive form rollers 3 may have any suitable shape whatsoever conforming to the annular grooving, notching, fluting or serrations 20 provided on the neck G of each bottle as well seen on FIG. 2. Likewise the annular cutting portion 2b of each cutting form roller 2 may have any suitable shape whatsoever adapted to sever the necks G of the bottles R. Also there may be any number of arms 1 forming nippers and likewise the rotary drive means of the shaft 5 and of the quill or sleeve 4 carrying each arm 1 may be of any kind whatsoever. In this respect it should pointed out as seen on FIGS. 4 to 6 that both arms 1 forming the two ends of the system comprise form rollers 2,3 at one end only.

Therefore the invention comprises all the technical equivalents of the means described as well as their combinations if the latter are carried out according to its gist and within the scope of the appended claims.

We claim:

1. A device for cutting off the upper portion of a container constituting for instance a neck of a bottle and of the kind comprising means for holding the bottle in order to allow its neck to be cut off by means of a cutting form roller, wherein the improvement comprises having said device include at least two pivoted arms which operate like nippers gripping round the neck of the bottle and at least one of which carries at least one cutting form roller for cutting off the said neck upon the rotation thereof, and driving and guiding form rollers, each of said arms being supported by and drivingly pivoted by a respective quill through each of which extends a shaft carrying a pinion driving pinions made fast to the at least one cutting form roller and to the form rollers for driving and guiding the bottle neck.

2. A device according to claim 1, wherein each aforesaid shaft carries intermediate pinions providing for the kinematic connection between the pinion carried by the arm and the aforesaid cutting and drive and guide form rollers.

3. A device according to claim 1, wherein each said quill is secured substantially in the middle of each arm so that the pinion carried by the shaft which extends through this quill successively drives on either side of the axis of the shaft a first intermediate pinion, a pinion made fast to one drive and guide form roller, a second intermediate pinion, a pinion made fast to a cutting form roller, a third intermediate pinion and a pinion made fast to another drive and guide form roller for the bottle neck.

4. A device according to claim 1, wherein each aforesaid quill from which is suspended and arm is fitted onto a tubular element secured to a frame and is removably fastened onto this tubular element by means of a screw.

5. A device according to claim 1, wherein each aforesaid quill is rotatable in either direction by a link pivotally connected to a rod or the like operable by a reciprocating means.

6. A device for cutting off the upper portion of a container constituting for instance a neck of a bottle and of the kind comprising means for holding the bottles in order to allow to cut off the neck by means of a cutting form roller, wherein the improvement consists in that said device comprises at least two pivoted arms which operate like nippers gripping round the neck of the bottle and at least one of said arms carries at least one cutting form roller for cutting off the said neck upon the rotation thereon, each of said first and second arms mounting first and second driving form rollers for driving and guiding the bottle neck, said cutting form roller being disposed between said first and second driving form rollers, each of a first and a second of said arms including a first end and a second end opposite said first end, said first and second ends having respective first and second curved depressions each adapted to receive part of a bottle neck, said first depression facing in a first direction and said second depression facing in a second direction opposite said first direction, said first and second arms being mounted so that the first depression of said first arm faces said second depression of said second arm when a neck of a common bottle is entered into both the first depression of the first arm and the second depression of the second arm.

7. A device according to claim 6, wherein each aforesaid arm is drivingly pivoted by a quill through which extends a shaft carrying a pinion meshing with other pinions made fast to the cutting form rollers and to the form rollers for driving and guiding the bottle neck.

8. A device according to claim 7, wherein each aforesaid arm carries intermediate pinions providing for the kinematic connection between the pinion carried by the arm and the aforesaid cutting and drive and guide form rollers.

9. A device according to claim 7, wherein said quill is secured substantially in the middle of each arm so that the pinion carried by the shaft which extends through this quill successively drives on either side of the axis of the shaft a first intermediate pinion, a pinion made fast to one drive and guide form roller, a second intermediate pinion, a pinion made fast to a cutting form roller, a third intermediate pinion and a pinion made fast to another drive and guide form roller for the bottle neck.

10. A device according to claim 7, wherein each aforesaid quill from which is suspended an arm is fitted onto a tubular element secured to a frame and is removably fastened onto this tubular element by means of a screw.

11. A device according to claim 7, wherein each aforesaid quill is rotatable in either direction by a link pivotally connected to a rod operable by a reciprocating means.

* * * * *